US010586247B2

(12) United States Patent
Vermolen et al.

(10) Patent No.: US 10,586,247 B2
(45) Date of Patent: Mar. 10, 2020

(54) SYSTEM AND METHOD FOR DETECTING AND CORRELATING INDIVIDUAL ACTION INFORMATION TO MEDIA CONTENT DISTRIBUTION

(71) Applicant: NBCUniversal Media, LLC, New York, NY (US)

(72) Inventors: Arturo Vermolen, Edgewater, NJ (US); Hai Xu, Kenvil, NJ (US); Vladislav Plazinskiy, Staten Island, NY (US)

(73) Assignee: NBCUniversal Media, LLC, New York, NY (US)

( * ) Notice: Subject to any disclaimer, the term of this patent is extended or adjusted under 35 U.S.C. 154(b) by 807 days.

(21) Appl. No.: 14/549,346

(22) Filed: Nov. 20, 2014

(65) Prior Publication Data

US 2016/0110757 A1    Apr. 21, 2016

Related U.S. Application Data

(60) Provisional application No. 62/064,899, filed on Oct. 16, 2014.

(51) Int. Cl.
*G06Q 30/02* (2012.01)
*H04N 21/81* (2011.01)
*H04N 21/422* (2011.01)
*H04N 21/442* (2011.01)
*H04N 21/41* (2011.01)

(52) U.S. Cl.
CPC ..... *G06Q 30/0246* (2013.01); *H04N 21/4126* (2013.01); *H04N 21/42201* (2013.01); *H04N 21/42222* (2013.01); *H04N 21/44213* (2013.01); *H04N 21/44222* (2013.01); *H04N 21/812* (2013.01)

(58) Field of Classification Search
CPC .................................................. G06Q 30/0246
See application file for complete search history.

(56) References Cited

U.S. PATENT DOCUMENTS

| | | | |
|---|---|---|---|
| 2011/0119132 A1* | 5/2011 | Morton | G06Q 30/02 705/14.53 |
| 2011/0178863 A1* | 7/2011 | Daigle | G06Q 30/0231 705/14.31 |
| 2012/0271715 A1* | 10/2012 | Morton | G06Q 30/0257 705/14.53 |
| 2013/0019262 A1* | 1/2013 | Bhatia | H04N 21/252 725/34 |
| 2015/0084838 A1* | 3/2015 | Chang | G06F 3/1454 345/2.1 |

OTHER PUBLICATIONS

"A guide from Digital Today and Retail Customer Experience: Measurement and Analysis for Digital Signage", by James Bickers. Published by NetWorld Alliance. 2009. pp. 5-18, 29 (Year: 2009).*

* cited by examiner

*Primary Examiner* — William A Brandenburg
(74) *Attorney, Agent, or Firm* — Lee, Hong, Degerman, Kang & Waimey PC

(57) ABSTRACT

Provided is a method for correlating individual action information with media content distribution, the method including obtaining data related to a presence of an external terminal relative to an output device providing media content, obtaining identifying information of a user associated with the detected external terminal, and storing, in a memory, data received from another party which indicates an action of the user at a virtual or physical location associated with a product or service presented in the provided media content.

14 Claims, 8 Drawing Sheets

SYSTEM AND METHOD FOR DETECTING AND CORRELATING INDIVIDUAL ACTION INFORMATION TO MEDIA CONTENT DISTRIBUTION

Pursuant to 35 U.S.C. § 119(e), this application claims the benefit of U.S. Provisional Patent Application Ser. No. 62/064,899, filed on Oct. 16, 2014, the contents of which are hereby incorporated by reference herein in its entirety.

Measuring the effectiveness of an advertisement campaign may provide significant benefits for providers of products and services being advertised, but also for content and advertisement providers. Some methods include determining quantifiable numbers of any change in sales of a particular product or service on a large scale level after the distribution of media content, including advertisements, related to the product or service in a particular geographic area.

However, no solution exists that allows content providers and advertisers to correlate specific impressions of media content, including advertisements, made on a specific target consumer with subsequent action metrics of the same target consumer with respect to the subject of the media content. Thus, there is a great need for a solution to effectively and specifically correlate subsequent individual action metrics with previous impressions of the advertisement media content provided to the specific individual.

SUMMARY

Embodiments of the present invention include a system and method for identifying specific instances of a target consumer's exposure to a particular advertisement, the exposure hereinafter sometimes referred to as an "impression", detecting subsequent actions of the target consumer, hereinafter sometimes referred to as a "user", correlating impressions with the subsequent behavior, and building and maintaining data related to behavior correlation with advertisements and profile information of the target consumer based on the correlated information.

According to one embodiment, a method for detecting and correlating individual action information with media content distribution includes identifying a personal terminal of a user within a proximate distance of a media output device outputting media content, generating database record including information related to the media content impression, storing the generated database record in a database, allowing access to the database by a third party to correlate the user's subsequent behavior with the media content impression.

Embodiments may include a system including devices, sensors, controllers, communicators, and one or more databases connected by a network, or implemented in one or more terminals to collect and store information. Target consumers may be associated with personal mobile devices that respond to radio signals emitted from communicators such as radio beacons placed throughout the consumers' homes or other locations.

According to one embodiment, a method for detecting and correlating individual action information to media content distribution includes providing media content to an output device to permit displaying of the media content on the output device, identifying a user as being present relative to the output device while the media content is displayed, and storing in a memory data received from a party which indicates an action of the user at a virtual or physical location associated with a product or service presented in the media content.

According to one embodiment, a method for detecting and correlating individual action information to media content distribution includes identifying the presence of a user, accessing a database and retrieving an event information record associated with media content impressions of the user, recording information related to the user's behavior correlating to the particular media content, and creating a new information record associated with behavior metrics of the user.

According to one embodiment, a method for detecting and correlating individual action information to media content distribution includes collecting information related to impressions of a user of particular media content, and correlating a subsequent behavior of the user related to the subject matter of the media content with the previous media content impressions.

According to one embodiment, a system for detecting and correlating individual action information to media content distribution includes an output device configured to output media content, a communicator associated with the output device and configured to identify a user as being present relative to the output device while the output device is outputting the media content, a controller configured to cause a memory to store data received from a party which indicates an action of the user at a virtual or physical location associated with a product or service presented in the media content.

According to one embodiment, a system for detecting and correlating individual action information to media content distribution includes a plurality of communicators configured to detect a presence of a mobile terminal associated with a user, a communication unit configured to transmit and receive information, a controller operatively coupled to the communication unit, wherein the controller is configured to communicate with a server via the communication unit to receive information associated with the user's previous media content impressions, and transmit information related to the user's presence at a virtual or physical location associated with a product or service presented in the media content.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for detecting and correlating individual action information to media content distribution to determine effectiveness of advertising on a granular level by detecting, collecting, maintaining, and correlating information related to exposure and impression of particular advertising content on a target consumer and subsequent actions and behaviors of the target consumer.

Figure 1:
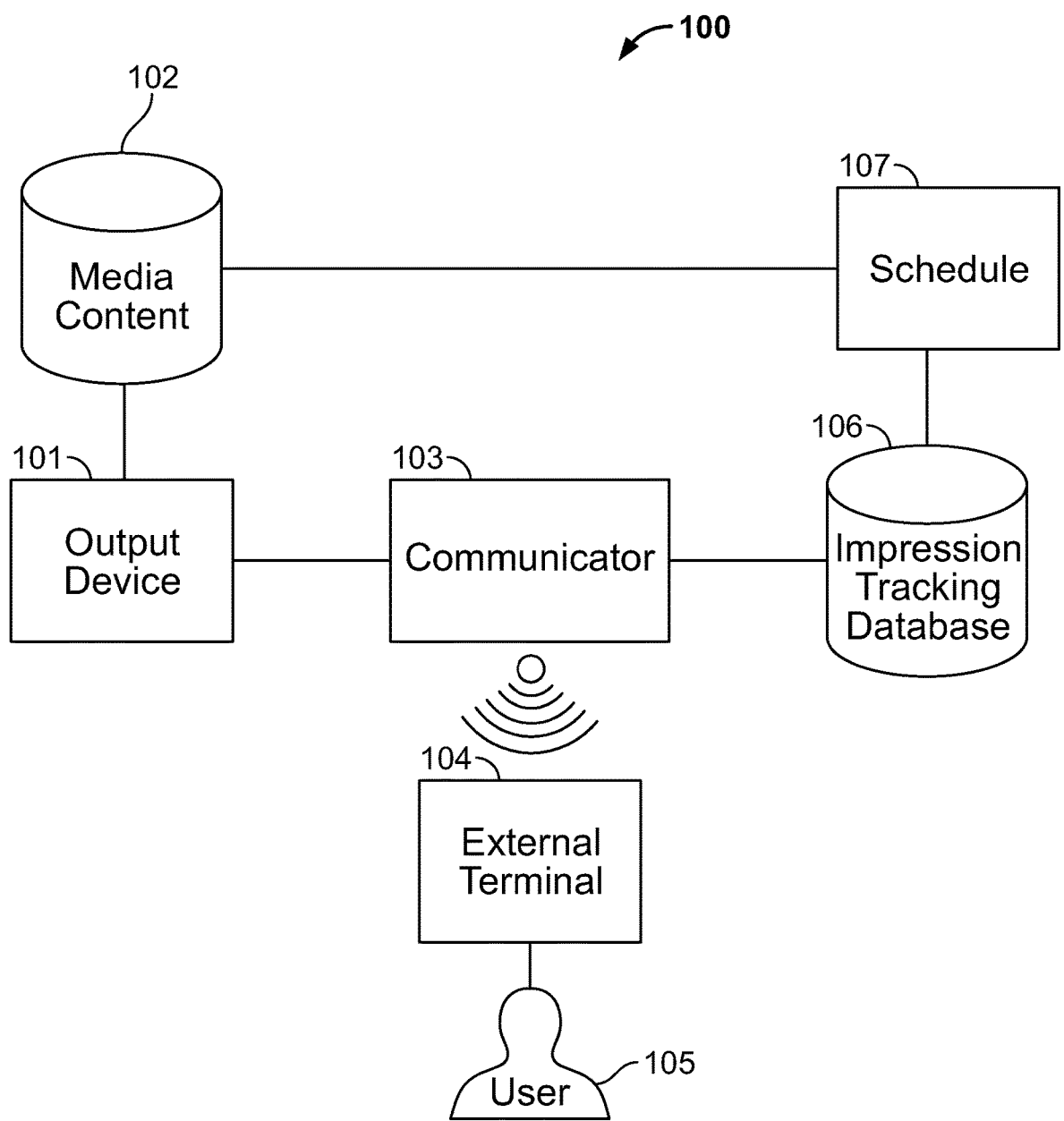
FIG. 1 is an illustration of a system for detecting and correlating individual action information with media content distribution in accordance with an embodiment.

Referring now to the figures, FIG. 1 illustrates an example of a system 100 for detecting and correlating individual action information to media content distribution of the present disclosure. The system 100 includes an output device 101 for outputting media content provided by a media content database or media content server 102. In the depicted example, output device 101 is configured to display or output audio/video content which includes the media content. Such content delivery hardware of the output device may include televisions, smart TVs, cable/satellite/pay TV set-top boxes, internet capable television boxes, desktop computers, laptop computers, video game systems, DVD players, tablets, smartphones, automobile entertainment systems, movie theaters, and the like.

However, other embodiments are considered with other types of media content which may include all advertisement in the form of video, audio, television, radio, print, billboard, mail, internet, mobile internet, in-vehicle advertisement, telephone marketing, theater, leaflet, catalog, in-person marketing, and the like. In such other embodiments, output device 101 may be replaced with other vehicles for media delivery according to the media to be directly delivered to a user.

The provided media content may also implement dynamic advertisement replacement configurations, wherein a dynamic advertisement system (not depicted) identifies a user and dynamically determines and provides advertising content based on stored profile information of the user. The stored profile information may include personal profile information including age, gender, occupation, income level, nationality, sexual preference, hobbies, activities, travel history, viewing history, purchasing history, and the like. The dynamic advertisement system may also interface with social networking databases such as FACEBOOK, TWITTER, INSTAGRAM, and the like, to retrieve the personal profile information for determining a desired advertising content to provide to the user. The dynamic advertisement system may utilize a communicator 103 and other detection and identification techniques (as discussed further below) to identify a user for determining and selecting the advertisement content to be delivered to the user.

The media content may also include primarily non-advertisement content with implied or secondary advertisement content inserted or incorporated into the non-advertisement content. For example, the media content may include a television show or a movie which includes strategic product placement exposed to the consumer via the storyline, audio, or video of the media content.

Referring back to FIG. 1, the system 100 further includes a communicator 103 associated with the output device 101. The communicator 103 may include transmitting, receiving, or sensing modules, with various configurations and components including sensors, beacons, transmitters, receivers, and the like. The communicator 103 may include wired and wireless communication hardware configured to allow the communicators to communicate with external devices, such as an external terminal 104 associated with a user 105. Specifically, the communicator 103 may be configured to detect the presence of the external terminal 104 via various wired and wireless communication protocols. Such communication protocols may include USB, HDMI and related data channels, Wifi, BTLA, DLNA, Bluetooth, Bluetooth LE, RFID, Zigbee, NFC, WiMax, Ethernet, and the like.

Embodiments of the communicator 103 may include wireless sensors or beacons, such as RFID readers, Bluetooth LE sensors, NFC sensors, and the like. The communicator 103 may be formed as a standalone unit, or may also be integrated in various modules of the system, including the output device 101. The communicator 103 may also be integrated with other static or dynamic content delivery systems, such as billboards, signs, bus stops, elevators, gas pumps, shopping centers, event centers, point of sale locations, furniture, appliances, and the like. This discussion is not intended to be limiting, as other embodiments are considered, wherein communicators are provided wherever media and advertising content can be delivered to a target user and a presence or other action of the user can be detected.

Via the communicator 103, the system 100 may detect a presence of the external terminal 104 associated with the user 105 while the media content is output on the output device 101. The communicator 103 may detect and collect various data regarding the presence of the external terminal 104, including a time and date of the detected presence, the distance of the external terminal 104 from the output device 101, a time duration of the detected presence, a movement of the external terminal 104 relative to the output device 104, and the like. The communicator 103 may be configured to associate the detected presence and collected data with the media content concurrently being output by the output device. In this example, the communicator 103 is discussed as communicating with the external terminal 104, but other embodiments may include communicators which identify target individuals by other means, including physical scanners such as face recognition, retina recognition, fingerprint readers, voice recognition, 3-D modeling recognition, pressure sensors incorporated in locations such as floors and seats, and the like.

In some embodiments, the external terminal 104 may be specifically configured to be detected by the communicator 103. In such embodiments, the external terminal 104 may execute a software application such as an application of a mobile external terminal which allows the external terminal 104 to be detected and/or communicate with the communicator 103. In other embodiments, the communicator 103 detects the external terminal 104 which is not specifically configured for detection by the communicator 103. In FIG. 1, only one external terminal 104 associated with one user 105 is shown, however the communicator 103 may be configured to detect and collect data regarding multiple external terminals 104 associated with multiple users 105 concurrently in the same space. When multiple external terminals are present in a single communicator 103 location, the communicator 103 may be configured to provide a notification or display information of the external terminal or terminals that are currently being communicated with. In other embodiments, the communicator 103 may present an option to select which external terminal or terminals are to be included or excluded in the communication with the communicator 103. Alternatively, the external terminal 104, or the application or software of the external terminal, may be configured to display a communication status or information of the communicator, and may also display options to connect to or disconnect from the communication with the communicator 103.

In certain embodiments, the external terminal 104 may be configured to communicate only with certain communicators, but not with other communicators. In the example of FIG. 1, the external terminal 104 is associated on a one-to-one basis with a user 105. However the user 105 may also be associated with multiple external terminals which are all detected by the communicator 103. Embodiments of the external terminal 104 may include personal computing devices such as smartphones, laptop computers, tablet computers, smartwatches, fitness tracking devices, biometric data devices, identification cards, embedded identification devices and the like.

The external terminal 104 may be associated with a unique user identifier (UUID) associated with the user 105 such that the user is identifiable based on recognition of the UUID. Where a user 105 is associated with multiple external terminals, such as where a user owns both a smartphone and a tablet computer, all devices associated with the user may be assigned the same UUID. Other embodiments may combine multiple detection and information storage systems and may not include a single unique user identifier across all participating systems, or may implement a single sign-on configuration across all external terminals of a user. Such embodiments may implement delegated access security or a separate security layer using an authorization server to issue authentication credentials, or a federated identifier schema such as the OAuth standard.

In addition to the UUID or other identification method as discussed above, the external terminal 104, such as a smartphone, may be configured to provide the communicator 103 with personal and identifying information of the user 105 in order for the communicator 103 to associate the presence of the user's external terminal 104 with the media content output by the output device 101. A program or application executed by the external terminal 104 may collect, store, and provide information related to the user, or the program or application may access other information stored or otherwise available on the external terminal form other sources, such as social media databases, call history, internet browsing history, online purchase history, and the like.

Upon detecting the presence of an external terminal configured to interact with the system, the communicator 103 may retrieve from, or receive from, the external terminal 104 identifying information related to the external terminal 104 and the user 105. Using this information, the communicator 103 may transmit the information to a server computer (not depicted), or otherwise cause an impression tracking database 106 of the system to generate and store an information record including data related to the presence of the external terminal 104 and the media content that was output by the output device 101.

In FIG. 1, information of the media content output by the output device 101 is received from a scheduling database 107 which includes information regarding the media content of the media content database 102 which is used to associate the media content that was being output at the output device 101 when the presence of the external terminal was detected. In other embodiments, the media content may be detected and identified by the communicator 103, output device 101, or other component of the system via methods including embedded audio and/or visual watermarks, audio/video fingerprint, content metadata, other automatic content recognition (ACR) technology, and the like. In certain embodiments, the media content information is obtained directly from the output device 101, such as where the media content is output from sources such as a DVD or BLURAY disc player.

The impression tracking database 106 and a controlling server computer of the database may be integrated into the output device 101, into the same device as the communicator 103, or otherwise be operatively connected with the communicator 103 via a network in order to receive and/or retrieve information from the communicator 103. Each impression event record of the impression tracking database 106 may include the UUID and may be further uniquely identified with a timestamp, an advertisement identifier (AdID) associated with the media content that was being output at the output device 101, or other unique identifying information of the impression event. Additional information may also be stored in association with the impression event, including duration of the detection, distance of the detection, time of day of the detection, location of the external terminal, start time of the output of media content, end time of output of media content, movement of the external terminal, biometric data of the user, environmental factors such as weather, ambient light measurements, temperature, and the like.

The impression tracking database 106 may be stored on a memory operatively connected to an operating computer, such as a server computer. The server computer may include various databases and database tables, or connections to other server computers including such databases or database tables, for providing various data of the system, including information related to individual user profiles, communicators, media content, advertisements, locations of communicators, output devices, products associated with advertisements, advertisement playlists, impression events, activities of a user during impression events, and the like. Referring back to FIG. 1, the impression tracking database 106 is configured to store database records of impression events associating a detected presence of an external terminal 104 associated with a user 105, with media content output on the output device 101, wherein the media content includes advertising content associated with an AdID. In this manner, a content provider or an advertiser may collect and refer to the impression tracking database 106 to obtain information on a particular user by UUID and any media content or AdID impressions which the UUID is associated with. The content provider or advertiser may further obtain additional information of the impression event such as duration, most recent media content impression event of the UUID, and the like, as discussed above.

Figure 2:
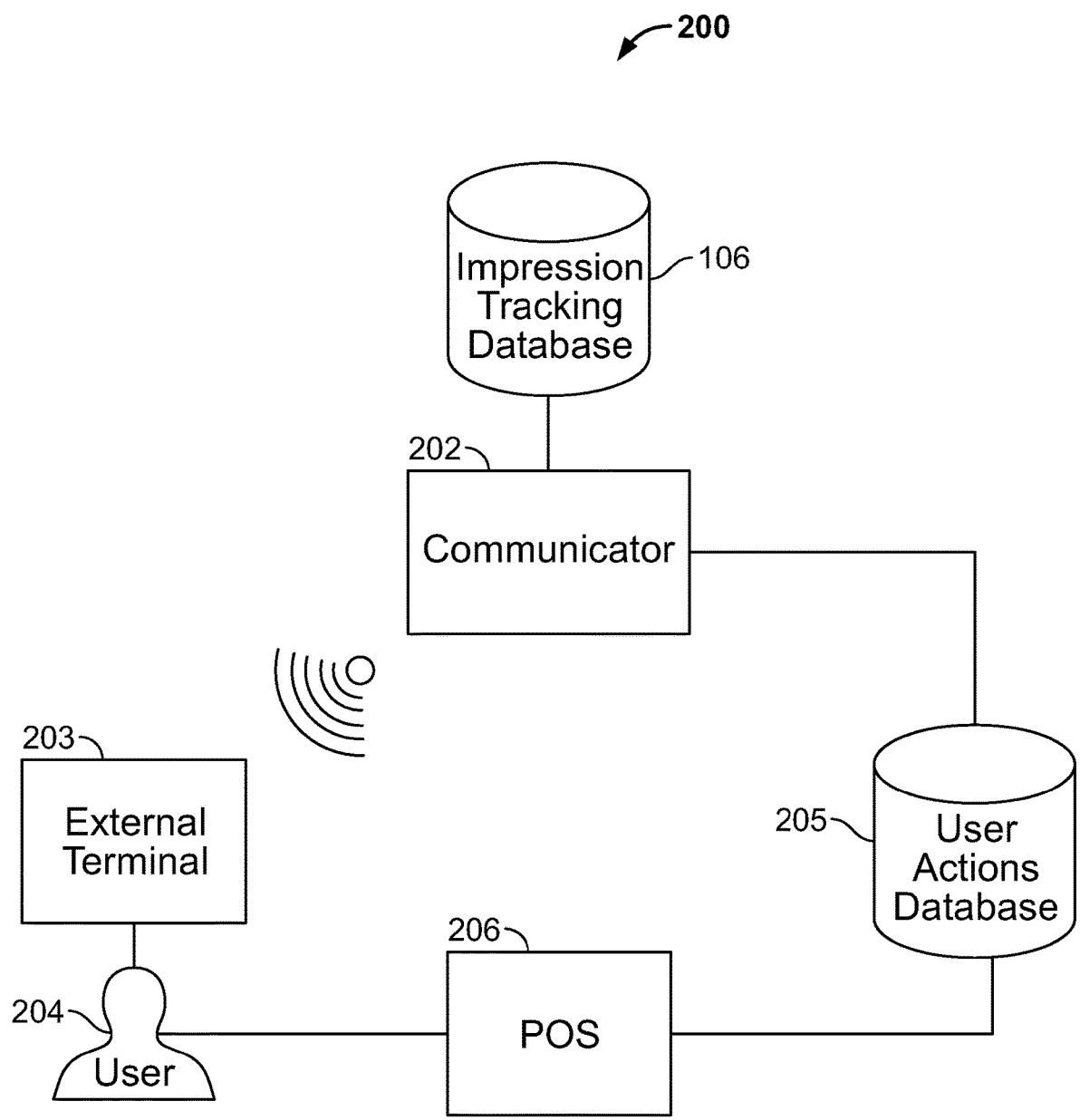
FIG. 2 is an illustration of a system for detecting and correlating individual action information with media content distribution in accordance with another embodiment.

Referring now to FIG. 2, another embodiment of a system 200 for correlating individual action information to media content distribution is depicted, specifically an aspect of the system implemented by a provider of products or services associated with the media content as previously described. In the example of FIG. 2, the system 200 may be implemented by a retailer providing goods at a physical store location, wherein the goods are the subject of an advertisement incorporated in the media content which was viewed by the user. In FIG. 2, the retailer may implement a communicator 202 as previously described, wherein the communicator is configured to detect presence of an external terminal 203 of a user 204 when the user enters the physical store location.

The retailer may use communicator 202 similarly to those previously discussed, or their implementation may be different and scaled to accommodate for increased capacity, including implementing multiple communicators 202 for the same purpose in a single location to increase throughput. The communicator 202 of the system 100 may be connected to the impression tracking database 106 as previously discussed, either directly or via one or more operating computer and network systems. Upon detection of a presence of an external terminal 203 of a user 204, the communicator 202 may identify the UUID or other identification information of the user and query the impression tracking database 106 for impression tracking records related to the identified user. In this manner, the retailer may obtain information related to impression events specifically related to the advertisements of the retailer's goods which occurred prior to the user's presence at the retailer's location. The retailer may be able to retrieve information related to the impression events of the user, including the location of the impression, the duration, the time of day, context of the advertisement, and the like, including the various information previous described.

The retailer may also use the impression tracking information to take a particular action with respect to the user based on the retrieved information. For example, the retailer of clothing may recognize that the user has recently watched an advertisement of the brand or clothing article and act upon a presumption that the user has come to shop for a certain article of clothing which was the subject of the watched advertisement. Based on this information, the retailer may offer a discount on the article of clothing, present information with emphasis on the article of clothing, instruct employees to engage the user with respect to the article of clothing, and various other actions on the basis of the retrieved information.

When retrieving information from the impression tracking database 106, emphasis may be placed on certain characteristics of impression events or advertisements viewed by an individual, such as the first impression within a certain time period, last impression during a time period, shortest time lapse since the impression event, most repeated impression for the user, or the like.

In addition to retrieving previously stored information, the system 200 may also be configured to record new database records regarding the user's presence at the retailer location. When the external terminal 203 associated with the user 204 is detected at a retailer location by communicator 202, the communicator 202 may be configured to cause the impression tracking database 106 to store a new database record including information related to the user's presence. In this manner, the user's presence at the retailer's location may be stored as a new impression event, wherein the user is exposed to advertising or promotional material of the retailer's brand or particular goods. The information stored related to the user's presence may include data regarding the duration of the user's presence, movement through the location, duration of the user's presence at particular areas of the retailer's location, and the like.

In another embodiment, the communicator 202 implemented at a retailer location may be configured to transmit or otherwise cause information to be stored in a user actions database 205. The user actions database 205 may be configured to store database records including information related to actions and presence of a user at particular locations. For example, the communicator may detect and collect information related to the duration of the user's presence, movement through the location, duration of the user's presence at particular areas of the retailer's location, and the like. In yet another example, where the external terminal comprises a smartphone enabled with near field communication (NFC) or other mobile payment methods, the communicator 202 may detect that the external terminal 203 was used to purchase a product at the retailer location, and cause the information of the purchase to be stored in the user actions database 205.

In another embodiment, the retailer may identify the user 204 using other methods, including physical scanners such as face recognition, retina recognition, fingerprint readers, voice recognition, 3-D modeling recognition, pressure sensors incorporated in locations such as floors and seats, and the like. The retailer may also identify the user at a point-of-sale (POS) 206 transaction by other information obtained from the user, such as credit card information used in a purchase, physical identification cards, and the like. The POS 206 may include a computer connected via a network to the user actions database 205 to create a new database record including information of the purchase transaction, including the price, style, time of day, and the like. The POS 206 may also be connected (not pictured) to the impression tracking database 106 in embodiments where the impression tracking database 106 is configured to store information including actions of the user such as purchases as impression events.

Figure 3:
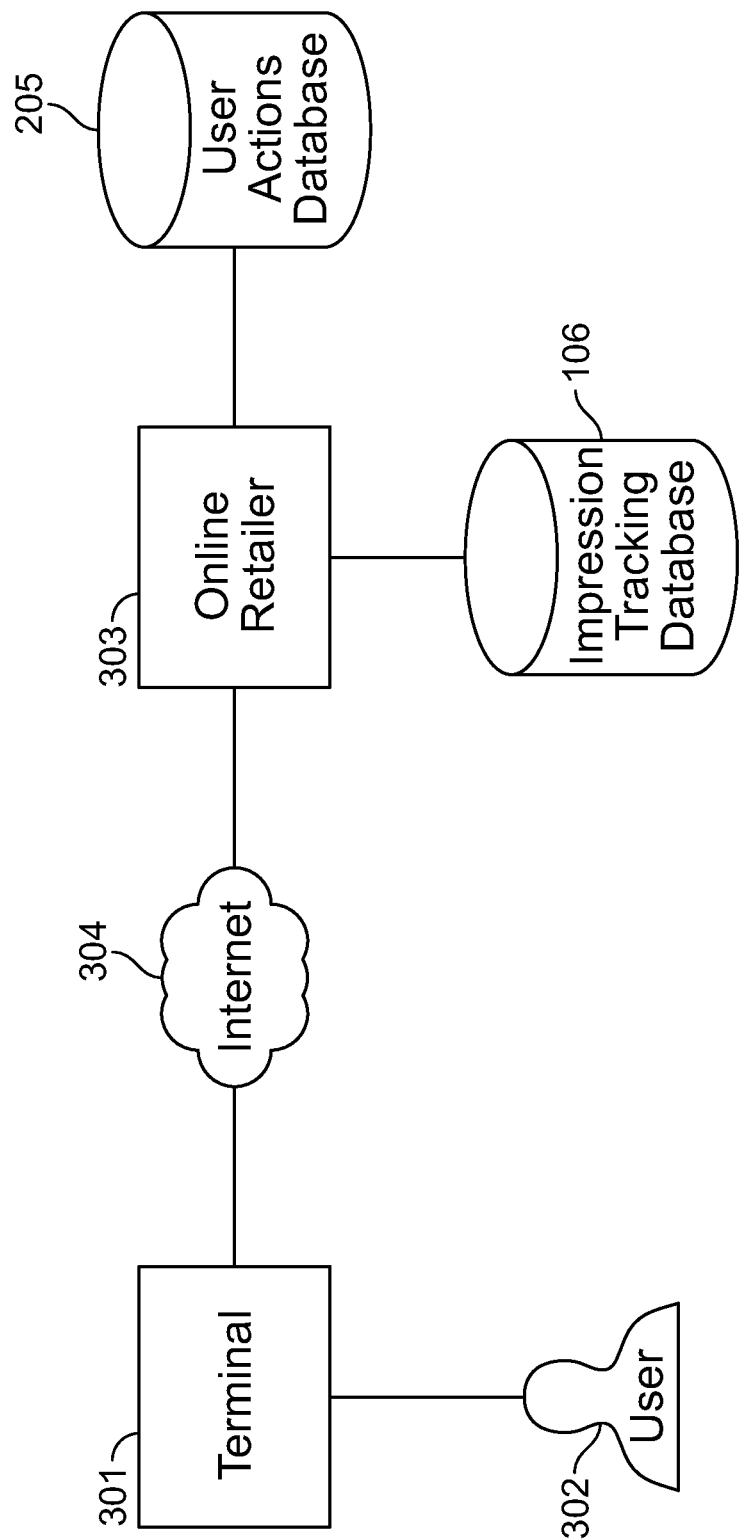
FIG. 3 is an illustration of a system for detecting and correlating individual action information with media content distribution in accordance with another embodiment.

The above example discusses a physical store location detecting a presence or actions of a user, however other embodiments may include other impression or action events such as online clicks, web page views, and online purchase transactions. FIG. 3 depicts an example where a presence or action of a user is detected and information is collected in the impression tracking database 106 or the user actions database 205. In such embodiments, a terminal 301 connected to an online retailer 303 via a network such as the Internet 304 may identify the user 302 with a UUID. The terminal 301 may include the same devices as considered and described above with respect to the external terminal, such as a smartphone, laptop computer, tablet computer, or the like. The online retailer 303 may include various server computers and may be configured to receive the UUID or other identifying information, and retrieve impression tracking information related to the user 302 from the impression tracking database 106 or user action information from the user actions database 205. Further, online retailer 303 may take the same actions with the detected presence as discussed above with respect to physical store locations, including creating database records in the impression tracking database 106 and the user actions database 205. All stores may also identify the presence and action of the target individual by other means, including a credit card number at time of purchase, IP address, user login information, and the like.

In some embodiments, the retail store or online retailer's access of the user's related impression tracking information may be unknown to the user, and in other embodiments, the user may be an active participant in enrolling in certain applications and programs, often times in exchange for receiving incentives. Other embodiments may require an initial opt-in by the user with no further action required by the user for authentication. Other embodiments may require the user to actively install or operate software application in a corresponding external terminal to activate requisite functionality between the external terminal and various communicators, and yet other embodiments may require the user to actively participate in detecting the user or a terminal of the user, for example asking the user to scan an NFC capable smartphone near a sensor, as in an embodiment using NFC sensors. The various modules and data layers of the embodiments may include encryption to ensure privacy of sensitive information, and various encryption methods known in the art may be implemented.

Figure 4:
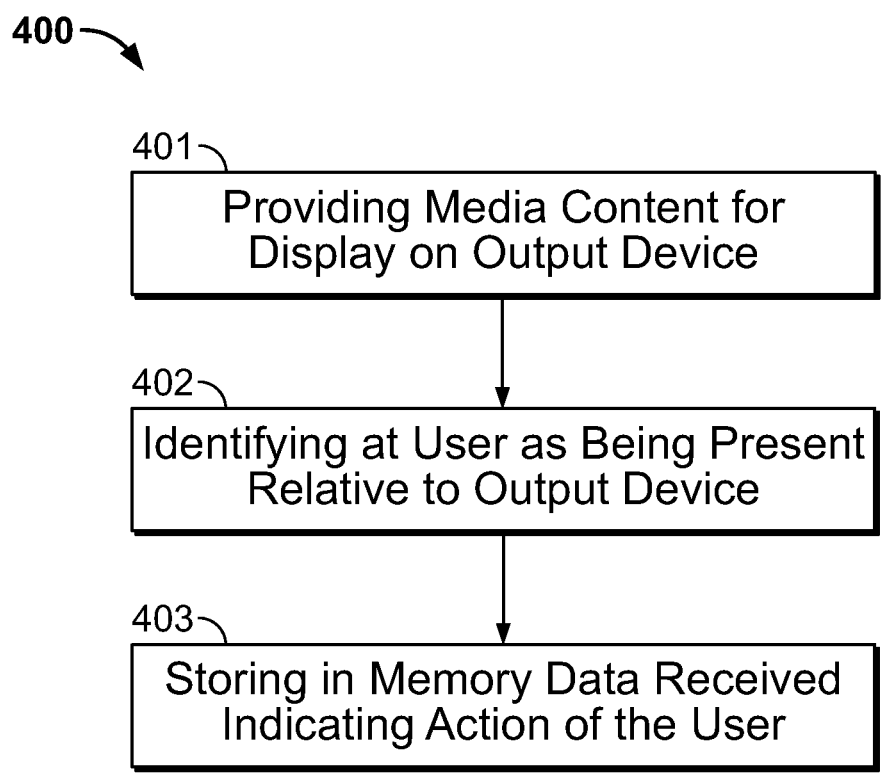
FIG. 4 is an illustration of a method for detecting and correlating individual action information with media content distribution in accordance with an embodiment.

FIG. 4 is a flowchart showing operations of an embodiment of a method 400 of the present disclosure for correlating individual action information to media content distribution. The method 400 includes an operation at block 401 of providing media content for display on a display device, as previously discussed. The media content may include advertising content related to a particular good or service. The method 400 further includes an operation of identifying a user as being present relative to the output device 402 that is outputting the media content. As previously discussed, embodiments may include identifying a user's presence by detecting and/or communicating with an external terminal associated with a user. The method 400 also includes an operation at block 403 of storing in a memory data received from a party which indicates an action of the user, including an action of the user at a virtual or physical location associated with a product or service presented in the media content. The data may be stored in a database such as the user action database as previously described. Although not pictured, the method may further include storing data related to the identification of the user's presence relative to the output device, and the data may be stored in a database such as the impression tracking database as previously described.

The embodiments described herein may be implemented to create a complete data profile of a user which correlates advertising content to all aspects of the advertisement-to-purchase loop, and even activity not resulting in a measureable sale, including data related to store visits, website visits, or any other action which shows interest by a user after an impression event. Such information of advertisement/transaction correlations may provide a granular level of measuring the efficacy of a certain advertisement, or a level of influence which advertisement content may have for a particular target individual, group, or demographic.

Figure 5A:
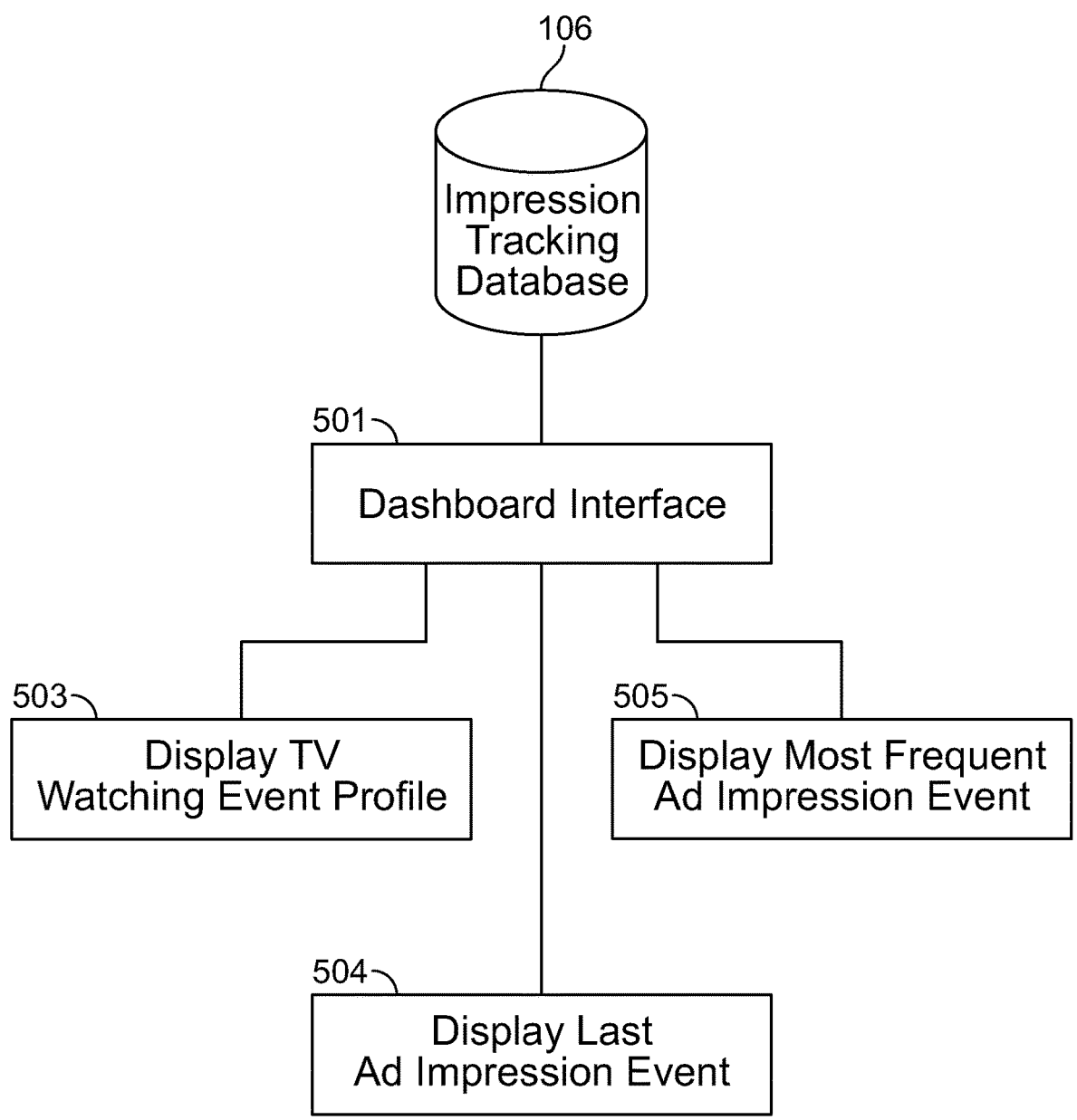
FIGS. 5(*a*), 5(*b*), and 5(*c*) are schematic illustrations of a dashboard interface for detecting and correlating individual action information with media content distribution in accordance with various embodiments.

One embodiment may further include presenting a dashboard interface for viewing data collected and maintained by the system of the present disclosure. Such dashboard may access the impression tracking database, the user actions database, the media content database, and the like, as described above. The dashboard may be displayed to present aggregated statistics or certain information records to a user of the dashboard, particularly advertising parties, media content delivery parties, and providers of advertised goods or services. FIG. 5(a) depicts an example of a dashboard interface for displaying various impression tracking information. For example, to gauge a user's viewing habits, a dashboard interface 501 may be provided to show information stored in the impression tracking database 106, including displaying information of a television watching event 503 wherein the user viewed a 30 minute television show which includes 15 media content impressions. The dashboard interface may be customized for the user's desired information, including displaying configurations such as the last impression event 504 for a particular user, the last impression event for a particular user related to a particular good or service, or a most frequent media content impression 505 of a particular user.

Figure 5B:
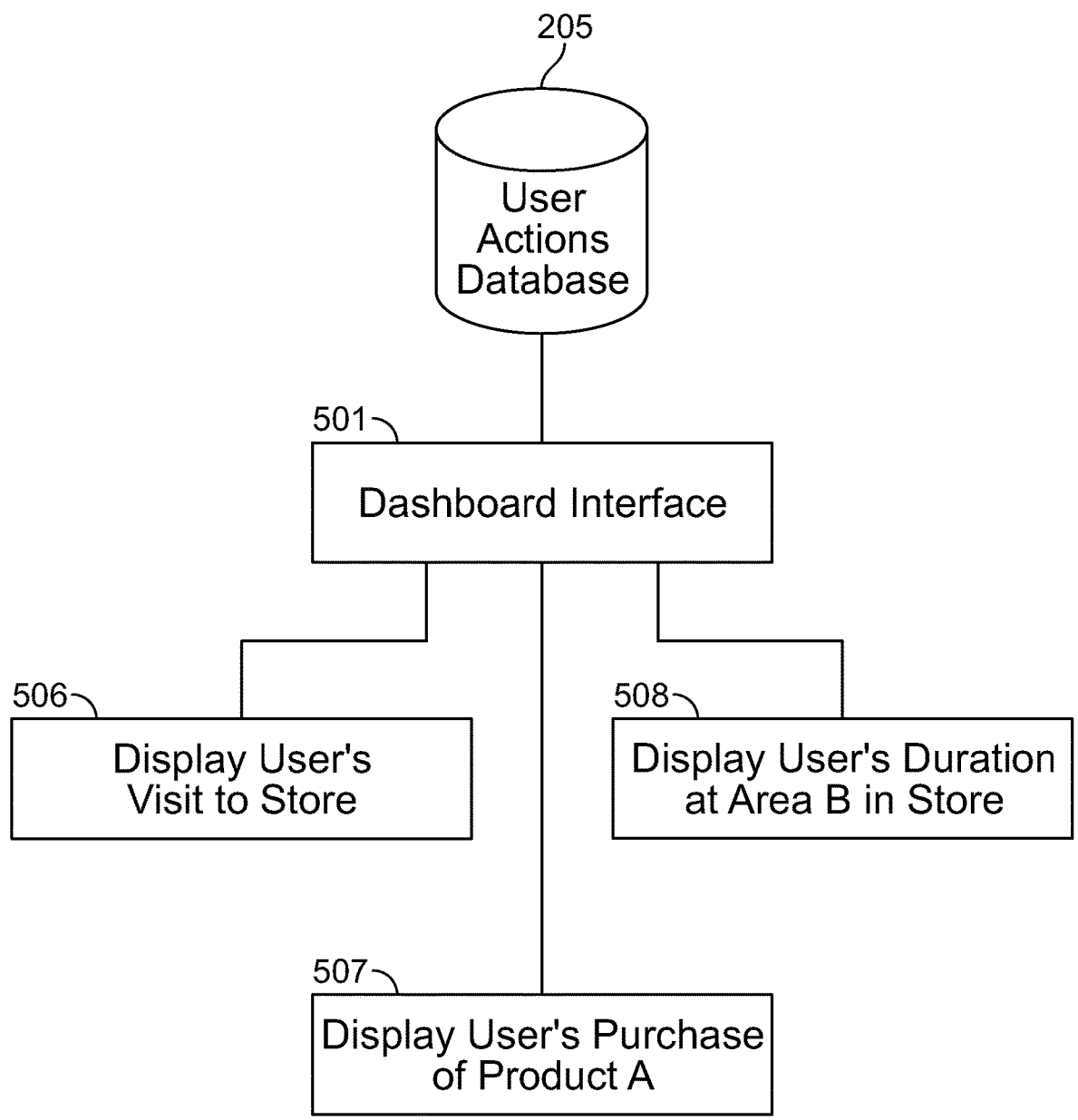

In another embodiment as shown in FIG. 5(b), the dashboard interface 501 may also be configured to access the user actions database 205 to present information detected with respect to actions of a particular user or demographic of users. For example, the dashboard interface may be configured to display information of a particular user's visit to a retailer location 506, a user's purchase of a particular product of interest 507, or a duration of a user's presence at a particular area in the retailer location 508, such as viewing a particular product or display. It will be understood by those of ordinary skill in the art that the dashboard interface may be configured and customized to display all combinations or forms of information stored in the impression tracking database 106 and the user actions database 205 as a user of the interface may wish to view.

Figure 5C:
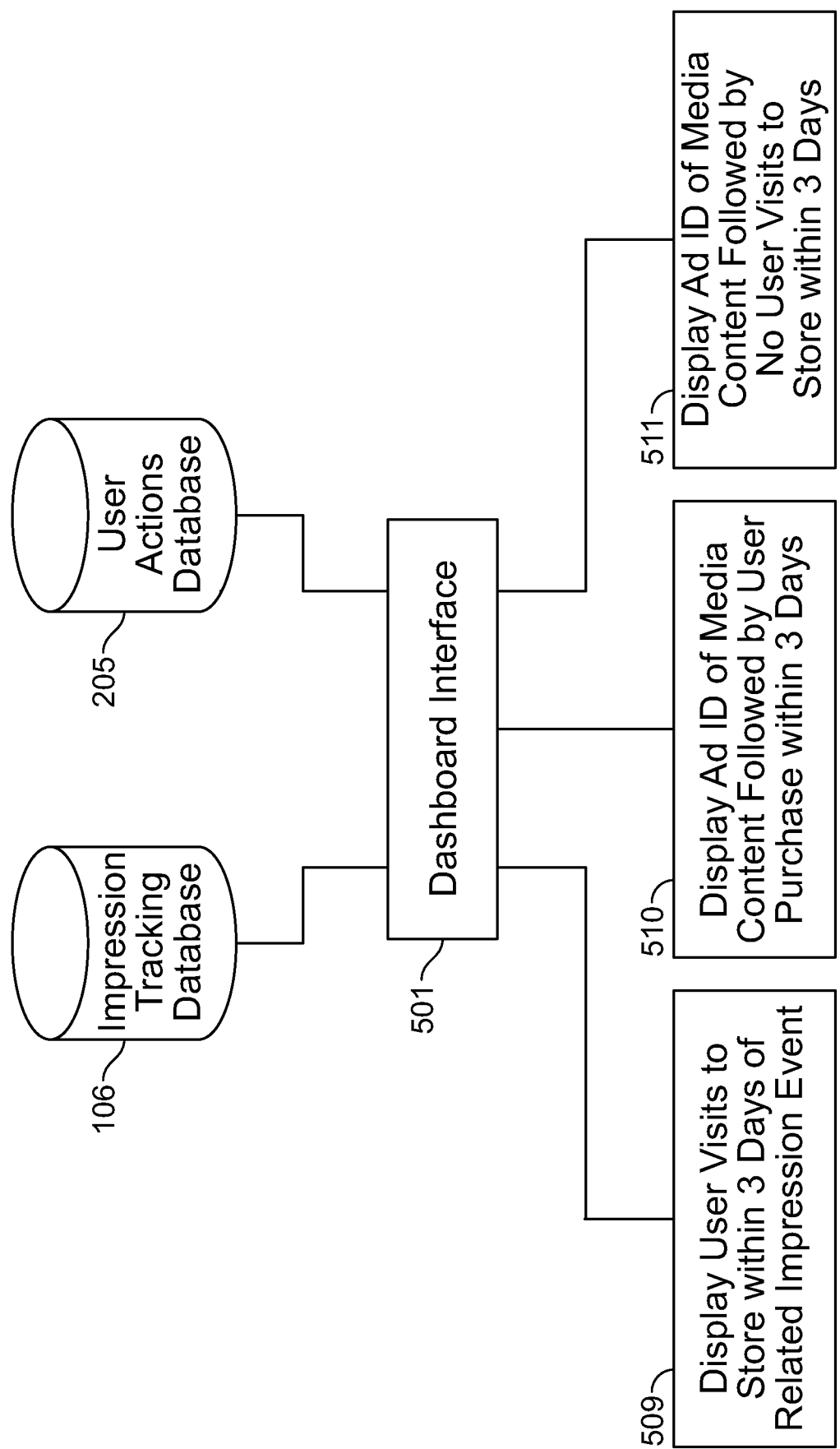

In yet another embodiment as shown in FIG. 5(c), the dashboard interface 501 may be configured to access the user actions database 205 and the impression tracking database 106 to present correlated information associating media content impression information with user action information. For example, the dashboard interface 501 may be configured to display all visits to a store by a user within 3 days of an impression event related to a product or service presented in the media content 509. In this interface display, a user of the dashboard interface may be able to view how effective particular advertising content is to a particular user. In another embodiment, the dashboard interface may be configured to display at block 510 AdID's of all associated media content wherein an impression event of the media content is followed by a user purchase of a related good or service within a certain number of days after the impression event. In this display, the interface may present data showing effectiveness of an advertisement for a particular user measured by the number of purchases following impression events. The dashboard interface 501 may also be configured to display at block 511 AdID's of all associated media content wherein an impression event of the media content of a user is followed by zero visits to a related retail store location by the particular user. As these are presented only by way of example, the information which may be correlated and presented may provide insight into the effectiveness of certain advertisements to which a particular user has been exposed.

Figure 6:
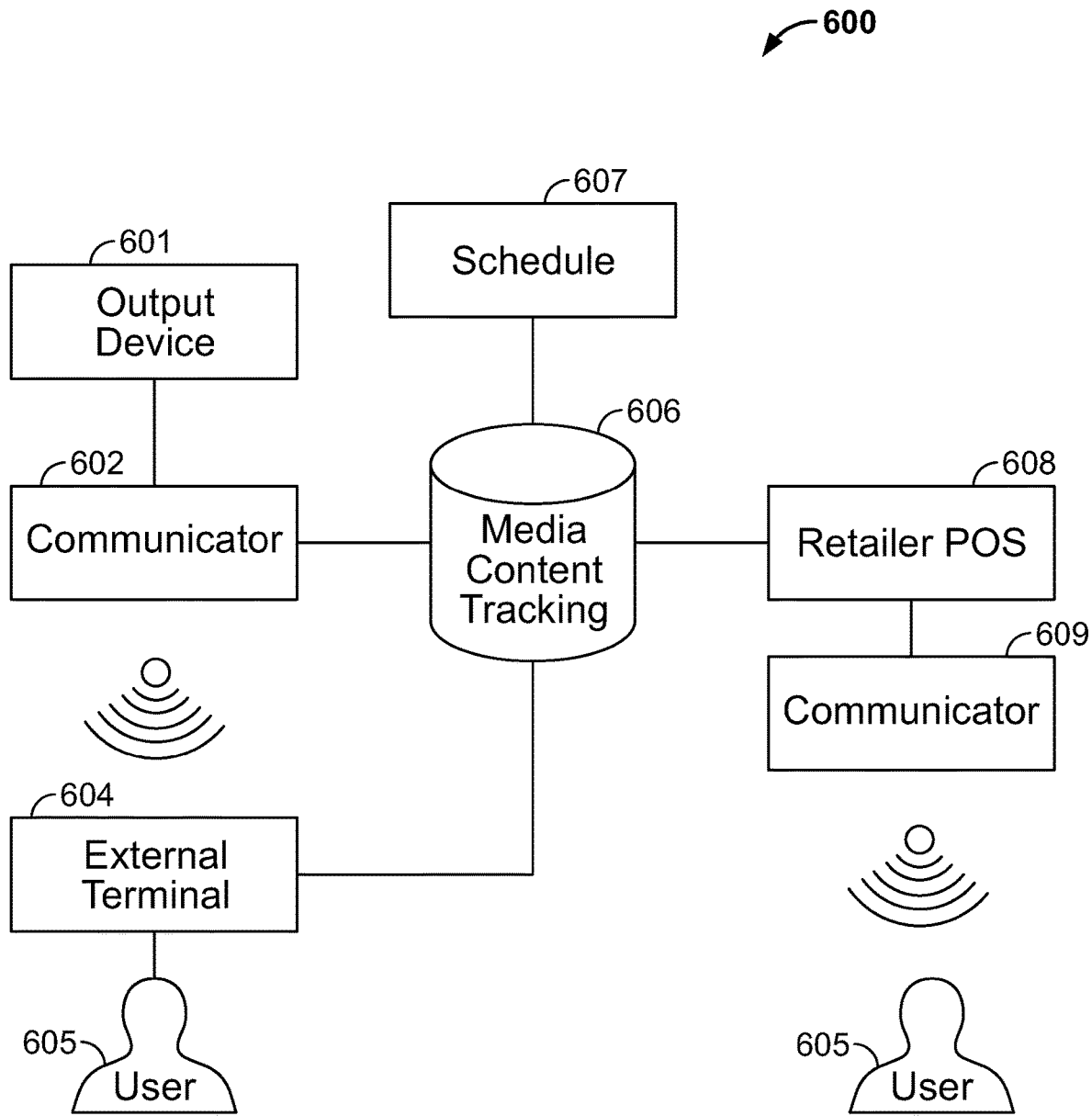
FIG. 6 is an illustration of a system for detecting and correlating individual action information with media content distribution in accordance with another embodiment.

FIG. 6 shows another embodiment of a system 600 for correlating individual action information to media content distribution. In the depicted embodiment, the system 600 may collect and combine all information in a media content tracking database 606, including information of media content scheduling from a schedule 607, information of impressions of the media content involving a user 605, media content being output by an output device 601, and presence detection information of an external terminal 604 detected by a communicator 602. Additionally, other aspects of the system may also operably connect, retrieve information, and update information in the media content tracking database 606, including a retailer POS 608, and a communicator 609 located at a retailer location providing information on presence detection of the user 605. The media content tracking database 606 may be configured to store the collected information with a database record representing a single event, including media content impressions, retailer POS transactions, user presence detection at a retailer location, and the like, as previously discussed with respect to other embodiments of the system.

Features disclosed with respect to embodiments of the present invention may be suitable for use in systems for storing, reproducing, annotation, cataloging, retrieval and distribution of advertisement content and tracking distribution, views, interaction, and exposure of the advertisement content to individuals. Features disclosed may be further applied in detecting, tracking, predicting, collecting, generating, and storing information related to an individual's subsequent actions, behaviors, and patterns following consumption and exposure to certain tracked advertisement content. Features disclosed may also be used to facilitate not only commercial (or non-commercial) use in determining the effectiveness of advertisements, but also for measuring the efficacy, quality, appeal, or otherwise effect on individuals of in-store and online experiences by consumers.

According to embodiments of the present invention, an advertising entity and a marketing entity in a system may include one or more computer systems, computer processors, storage devices, distribution channels, etc., in order to distribute advertisement content to a target audience and track its effectiveness. Portions of the advertisement content may reside in different locations, or may be distributed widely and coordinated with one another, particularly in a large organization. Moreover, particular portions may reside in entirely separate environments, such as advertisement and content distribution chains, clearing houses, advertisement and content creation companies, etc.

Various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor.

The various devices, modules, terminals, and the like discussed herein may be implemented on a computer by execution of software comprising machine instructions read from computer-readable medium. These hardware aspects may further include an input/output interface, graphical user interface, or other input/output means to allow the input/output of information related to controlling functions, inputting information, outputting information, receiving information, or transmitting information. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for correlating individual action information with media content distribution via a communicator device, the method comprising:
   detecting, at the communicator device via a hardware sensor, a physical presence of an external terminal proximate to a hardware output device outputting media content, wherein the communicator device is a standalone device separate from the hardware output device; receiving, at the communicator device, context data of the detected external terminal comprising at least one of a current physical location of the external terminal, a physical distance of the external terminal from the hardware output device, physical movement information of the external terminal, or a time of day the physical presence of the external terminal is detected;
   receiving, at the communicator device, user identification (ID) information of a user associated with the detected external terminal;
   detecting, at the communicator device via one or more sensors, outputted audio or video of the media content that has been outputted by the hardware output device;
   performing automatic content recognition using information embedded in the outputted media content, the automatic content recognition comprising recognizing at least one of an audio watermark, a video watermark, an audio fingerprint, a video fingerprint or content metadata that is embedded in the media content which corresponds to a known media content;
   obtaining media ID data of the media content being outputted by the hardware output device based on the automatic content recognition; and
   generating a data record comprising the media ID data and the user ID information of the user.

2. The method of claim 1, wherein the context data is received when the external terminal executes an application related to presence detection.

3. The method of claim 2, wherein the context data further comprises: a length of time the external terminal is detected relative to the hardware output device.

4. The method of claim 1 further comprising connecting to the external terminal via a network to obtain the context data.

5. A communicator device for correlating individual action information to media content distribution, the communicator device comprising:
   a hardware sensor; and
   a hardware controller configured to:
   detect, via the hardware sensor, a physical presence of an external terminal proximate to a hardware output device outputting media content, wherein the communicator device is a standalone device separate from the hardware output device;
   receive context data of the detected external terminal comprising at least one of a current physical location of the external terminal, a physical distance of the external terminal from the hardware output device, physical movement information of the external terminal, or a time of day the physical presence of the external terminal is detected;

receive user identification (ID) information of a user associated with the detected external terminal;

detecting, via one or more sensors of the communicator device, outputted audio or video of the media content that has been outputted by the hardware output device;

perform automatic content recognition using information embedded in the outputted media content, the automatic content recognition comprising recognizing at least one of an audio watermark, a video watermark, an audio fingerprint, a video fingerprint or content metadata that is embedded in the media content which corresponds to a known media content;

obtain media ID data of the media content being outputted by the hardware output device based on the automatic content recognition; and generate a data record comprising the media ID data and the user ID information of the user.

6. The device of claim 5, wherein the context data is received when the external terminal executes an application related to presence detection.

7. The device of claim 5, wherein the context data further comprises a length of time the external terminal is detected relative to the hardware output device.

8. The device of claim 5 further comprising a communication unit, wherein the controller is configured to cause the communication unit to connect to the external terminal via a network to allow the controller to obtain the context data.

9. A method for correlating individual action information to media content distribution, the method comprising:

detecting, at a first physical location, a physical presence of an external terminal proximate to a hardware output device outputting specific media content associated with one or more products;

receiving user identification (ID) information of a user associated with the detected external terminal;

detecting outputted audio or video of the specific media content that has been outputted by the hardware output device;

performing automatic content recognition using information embedded in the specific media content being outputted by the hardware output device, the automatic content recognition comprising recognizing at least one of an audio watermark, a video watermark, an audio fingerprint, a video fingerprint or content metadata that is embedded in the specific media content which corresponds to a known media content;

obtaining media ID data of the specific media content being outputted by the hardware output device based on the automatic content recognition; and generating a data record comprising the user ID information and the media ID data, and transmitting the generated data record via a network for storage in a database;

detecting via a hardware sensor, at a second physical location, a subsequent physical presence of the user at a second physical location via detection of a terminal associated with the user, wherein the first physical location and the second physical location are different physical locations;

receiving user identification (ID) information of the user from the detected terminal;

generating a query for events associated with the user ID information and transmitting the generated query via the network to the database, wherein the query requests a most recent event within a particular previous time period corresponding to a user's viewing impression of distributed media content related to at least one of the one or more products and information related to a number of viewing impressions by the user of media content related to at least one of the one or more products within the particular previous time period;

receiving, from the database, event data comprising at least the generated data record stored in the database responsive to the query;

outputting interaction data to be performed at the second physical location with respect to the user based on the received event data, wherein the interaction data is determined based on one or more viewing impressions of the user related to the one or more products during the particular previous time period; and transmitting information for storing a new event data in the database comprising information related to the presence of the user at the second physical location and the output interaction data.

10. The method of claim 9, wherein the received event data comprises a most recent date within the particular previous time period corresponding to a viewing impression of the distributed media content for the user or a number of viewing impressions of the distributed media content within the particular previous time period for the user.

11. The method of claim 9, wherein the subsequent physical presence of the terminal is detected when the terminal executes an application configured to interface with a communicator at the second physical location.

12. The method of claim 9, wherein the subsequent physical presence of the terminal is detected during a purchase transaction by the user of at least one of the one or more products.

13. The method of claim 12, wherein the output interaction data comprises a calculated cost of the purchase transaction based on the received event data.

14. The method of claim 9, wherein the stored new event data comprises information of a purchase transaction by the user of at least one of the one or more products.

* * * * *